INVENTOR.
WALTER H. CHUDLEIGH, JR.
BY
Nelson E. Kimmelman
ATTORNEY

March 28, 1967 W. H. CHUDLEIGH, JR 3,311,894
SYSTEM FOR CONTROLLING AMPLITUDE OF AN ANALOG SIGNAL BY USE
OF A DIGITAL SIGNAL DERIVED FROM SAID ANALOG SIGNAL
Filed Dec. 10, 1963 2 Sheets-Sheet 2

INVENTOR.
WALTER H. CHUDLEIGH, JR.
BY
Nelson E. Kimmelman
ATTORNEY

United States Patent Office 3,311,894
Patented Mar. 28, 1967

3,311,894
SYSTEM FOR CONTROLLING AMPLITUDE OF AN ANALOG SIGNAL BY USE OF A DIGITAL SIGNAL DERIVED FROM SAID ANALOG SIGNAL
Walter H. Chudleigh, Jr., Norristown, Pa., assignor, by mesne assignments, to T.R.G. Inc., Rosemont, Pa.
Filed Dec. 10, 1963, Ser. No. 329,588
7 Claims. (Cl. 340—172.5)

This invention relates to an information storage system and in particular to a novel system for efficiently recording digfiital data representative of low duty-cycle information.

In certain types of radar system the intervals between the transmitted and the echo pulses are quite large. Thus, if these echo pulses are recorded by a magnetic tape recorder, for example, there is a very low "duty cycle," that is to say, the amount of space on the tape occupied by the useful recorded pulse echoes is very small compared to the total length of the tape used. Typical instrument radars have receiver duty cycles of the order of one percent. A particular case in point is a radar system for tracking a man-made satellite, for example, as it proceeds from its orbit to earth upon reentry into the earth's atmosphere. As the satellite is not likely to be in a part of the atmosphere occupied by other radar-pulse reflecting objects, there is little information of interest to the radar receiver in the interval between successive echo pulses. Considering the speed of the satellite and the fact that objects associated with the satellite (such as debris from the launching rocket spread out of a distance of a couple of miles) often may accompany it, the width of the echo pulses may be, for example, ten to twenty-four microseconds. However, if the spacing between successive echo pulses is on the order of 1236 microseconds, for example, it is obvious that much of the available tape space will be devoid of recorded information. Furthermore, if the echo pulses are recorded in the form in which they are actually received, i.e., as analog data, fluctuations in the speed of the tape are more likely to introduce distortions and errors into the recorded signals than into signals recorded in digital form. When recording echo signals in analog form, analysis of the recorded data might require Doppler filters to extract frequency and hence velocity information therefrom. If these filters are used prior to recording it requires that all the frequency ranges of interest be known in advance which may not always be convenient or practical. Data which does not fall within the selected filters is not recorded and hence is not available for analysis later. Furthermore, regardless whether Doppler filters are used before or after recording, they are very expensive and raise some bandwidth problems. Additionally, if these recorded analog signals are to be processed by conventional computers, they must be first programmed into a form suitable for the computer input, a process which may take months and hence analysis and use of the data is delayed.

To avoid these distortions and delays it would be desirable to record the echo pulse information in the form of digital data. Once having decided to record digital rather than analog information it is advantageous to have a system which can effectively deal with echo signals whose amplitude varies considerably within a very wide range. For a given bandwith such as 4 megacycles, conventional analog-to-digital converters are known which can handle signals with as much as 40 db difference between the lowest and highest amplitudes. However, the amplitude of echo signals encountered in radar systems for tracking satellites, for example, may fall within a range which is as large as 80 db.

It is therefore among the objects of the present invention to provide:

(1) A system for efficiently processing electrical signals having a low duty-cycle.

(2) A system for efficiently recording on an appropriate medium digital signals representative of low duty-cycle analog signals.

(3) A system for efficiently recording digital signals whose amplitude varies over a very wide range.

(4) A system for effectively recording information corresponding to a relatively large number of bits which necessitates actually recording only a fraction of that number of bits.

(5) A system for providing analog-to-digital conversion of data having a very wide amplitude range.

(6) A system for preparing analog data having a wide amplitude range for recording as digital data on relatively inexpensive magnetic tape recorders.

(7) A system for recording coherent radar data representative of wide amplitude range echo signals without losing information due to the use of Dopper filters and the like.

These and other objects of my invention which will occur to those skilled in the art on persusal of the drawings, specification and claims herein, are accomplished by applying the received analog signals to two parallel paths. In the first path the signals are amplified and in the second path the received signals are amplified and converted to a first digital signal representative of its amplitude. The amplified analog and the first digital signals are then applied to a circuit which attenuates the analog signal as a function of the first digital signal. The attenuated signal is then demolulated, either coherently or non-coherently as desired, and then converted to a second digital signal for analysis, recording, or other utilization.

Figure 1:
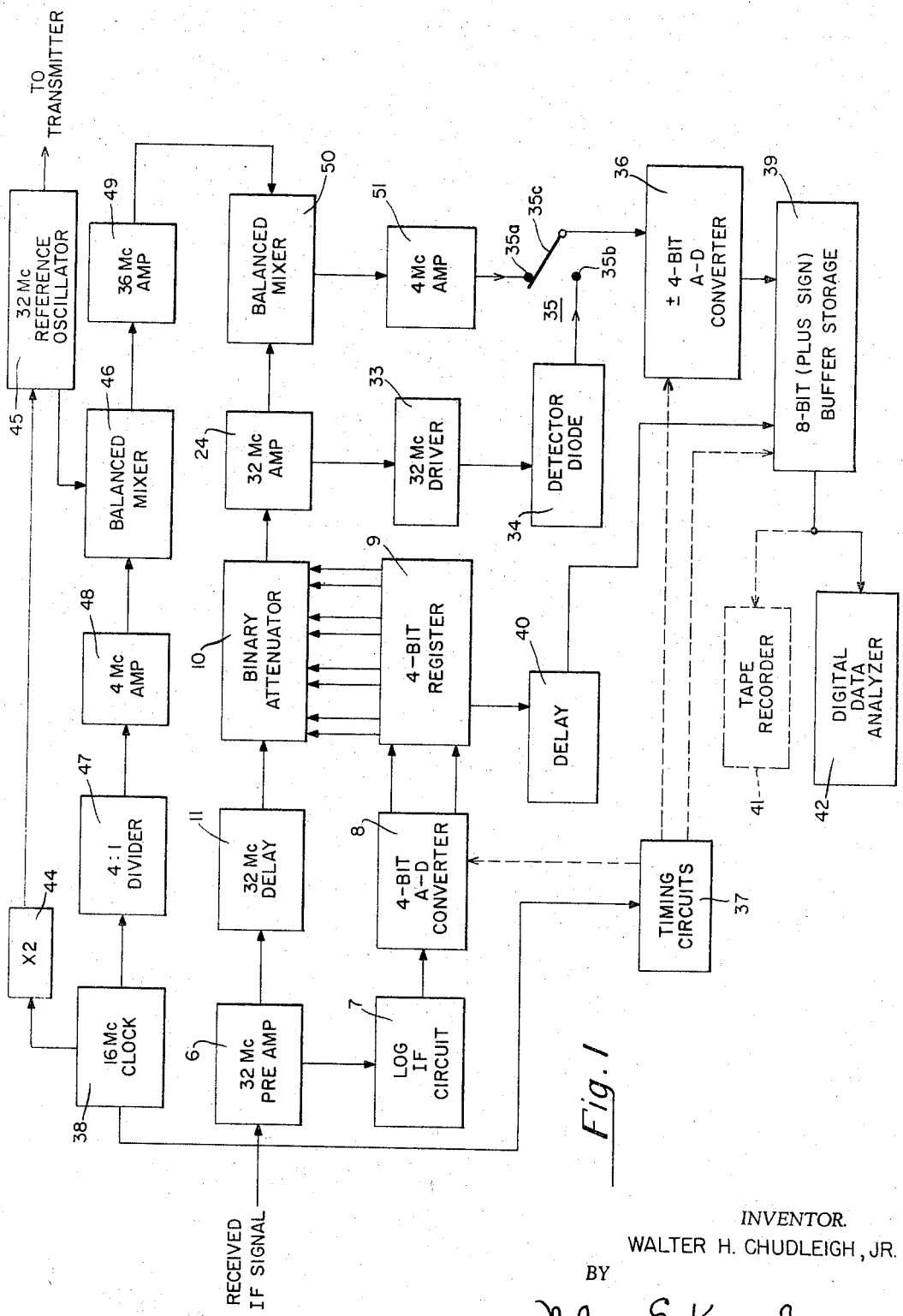
FIGURE 1 is a block schematic diagram of an overall system constructed according to one form of my invention.

Referring to FIG. 1 the reflected RF echo signals are initially applied to appropriate heterodyne circuits, for example (not shown), to produce predetermined intermediate frequency (IF) signals having a bandwith of say, 4 megacycles. These reflected signals will range over a very wide amplitude range. Since ultimately these signals will be detected by a detector device such as a crystal diode, for example, it is desired to have the input to that detector stabilized within certain amplitude ranges so that it operates upon the linear part of its curve to avoid distortion. For example, if the input to the diode is excessive, it would cause saturation limiting whereas if the input signal is too weak, it will fall upon a non-linear part of the operating curve of the detector. A typical dynamic range for linear operation of the detector diode could be, for example, 20 db unless signals below a certain level, say, 0.4 volt, are also to be accommodated in which case a 40 db dynamic range could be handled by the detector.

The IF signal may require perhaps 100–120 db gain and this may be partially provided by the preamplifier 6 which has two output circuits. The IF signal may have an amplitude which varies over an 80 db range so that amplification by a simple tube or transistor circuit is not possible. It is therefore necessary to compress the IF signal amplitude. One of the outputs of preamplifier 6 is connected to a so-called "log IF strip" which provides some amplification, compresses the IF signal and effectively demodulates it to produce a video signal output which is a logarithmic function of the input. These strips usually include means for adjusting the exponent. One such amplifier is the M 231 type produced by Instruments for Industry, of Hicksville, N.Y., which has the ability to handle input signals varying over an 80 db range, for example. Other suitable log IF amplifiers or similar circuits which compress, amplify and detect may, of course, alternatively be used. The video output signal from the log IF strip 7 is then applied to a conventional analog-to-digital converter capable of handling four bits such as the Model AD–50A converter manufactured and sold by the Raytheon Corporation. Converter 8 converts the video input into a four-bit binary word which is then applied to a conventional four-bit buffer or register 9. The function of register 9 is to apply signals for controlling attenuation introduced into the received echo signals by a binary attenuator 10 so that the latter, as will be explained more fully below, will produce output signals having a predetermined maximum variation in amplitude.

A second output of the preamplifier 6 is also coupled to the binary attenuator 10 via 32 megacycle delay line 11 which compensates for the delays introduced in the log IF strip 7, in the converter 8 and in the register 9. This delay line may be, for example, a "Spiradel" miniature delay line made by Beckman Instruments, Inc. This delay line insures properly timed control by the register 9 of the amplitude of the echo signal in attenuator 10.

Figure 2:
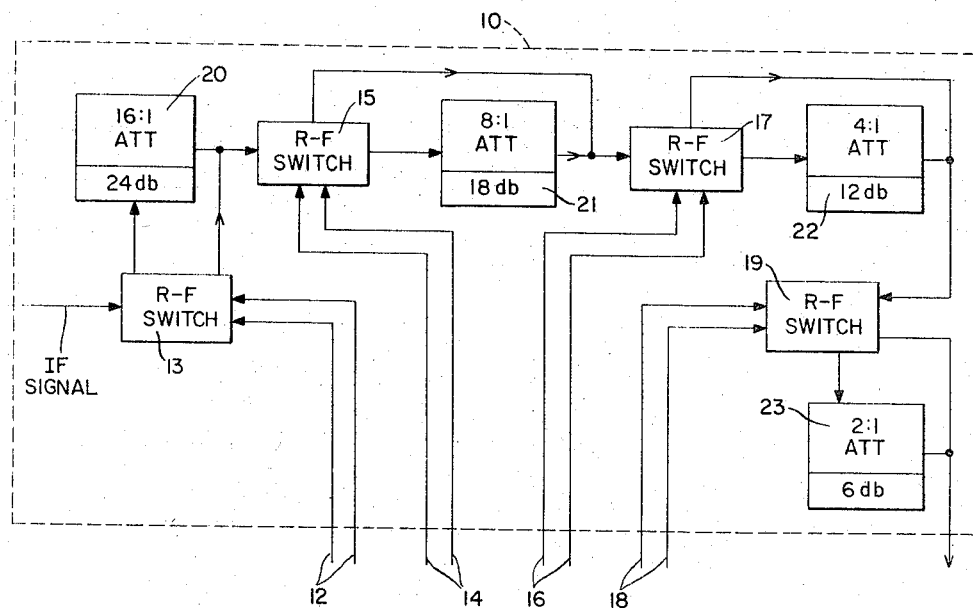
FIGURE 2 is a detailed block diagram of the components of one of the blocks of FIG. 1.

The attenuator 10, as shown in FIG. 2, may consist, in one embodiment, of four RF switching stages capable of switching the 32 megacycle IF signal at four megacycle rate through either of two signal paths. One path is essentially a short-circuit to the next successive switch. The other path leads to an attenuator circuit having predetermined characteristics.

At any instant of time, the binary number in the four-bit register 9 will represent the amplitude of the received echo pulse. There are four pairs of leads 12, 14 16, 18 by which "zeros" or "ones," as the case may be, are applied from respective storage stages in register 9 to the RF switches in the attenuator 10. The most significant digit of that number will be applied via leads 12 to RF switch 13. The next most significant figure will be applied via leads 14 to RF switch 15. The next figure will be applied via leads 16 to RF switch 17 and the least significant figure in the register 9 will be applied via leads 18 to RF switch 19. It will be seen that the 32 megacycle IF signal from the delay line 11 is applied only to the RF switch 13 initially but, depending on the setting of that switch, the signal may be coupled either directly (via a short circuit) to the input of the next successive switch or indirectly thereto via the attenuation circuit 20 coupled to one output of the switch.

It will be noticed that the most significant digit in register 9 is applied to the attenuator having the largest attenuation characteristic, the least significant figure in the register is applied to the attenuator having the smallest attenuation characteristic and the figures in between are correspondingly treated. Consequently, the larger the number in the register 9 the greater will the attenuation of the IF signal applied to the attenuator 10 and vice versa. For example, if the binary number in attenuator 10 is "1010," the switches 13 and 17 would be positioned by the signals representing "ones" in their respective input leads 12 and 16 so that they would route the incoming IF signals through the attenuators 20 and 22 in sequence. The switches 15 and 19 would, to the contrary, be set by the "zero" representative signals in their respective input leads 14 and 18 to route the IF signals in their respective inputs around the next following attenuators 21 and 23 to the switch 17 and to the amplifier 24 respectively. Thus, the IF signal applied to binary attenuator 10 would be attenuated by 36 db. As may be seen, the attenuator 10 can, if all of the component attenuators therein are switched into the circuit, introduce a total attenuation of 60 db.

Figure 3:
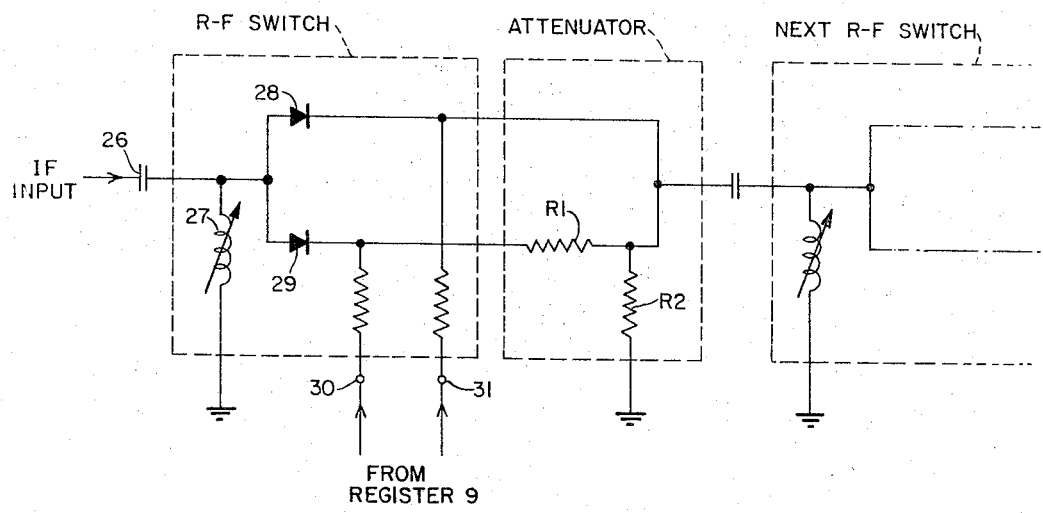
FIGURE 3 is a schematic diagram of one form that some of the components appearing in FIG. 2 may take.

One example of an RF switch circuit plus a following attenuator circuit that can be employed in the attenuator 10 is shown in FIG. 3 and will now be described. The IF signal from the delay line 11 is fed to an RF switch via a coupling capacitor 26 which is connected to two parallel paths. A variable inductance 27 is provided for control of the amplitude of the input signal to the two paths. In one path there is located an RF switching diode 28 which, when it is conductive, couples the input signal to the input of the next RF switching stage through an essentially resistanceless circuit.

In the other switching path there is located another switching RF diode 29 coupled to an attenuator circuit consisting of resistance elements R1 and R2 as shown. The values of these two resistance elements are chosen to give the desired attenuation characteristic. The switching path is chosen by the application to the terminals 30 and 31 of "zero" and "one" signals from one of the pairs of leads in the output of the register 9. It is to be understood that each of the leads in each pair is connected to a different side of a flip-flop circuit, for example, in the register 9, each flip-flop producing oppositely polarized signals at different points therein. Thus, for example, if the flip-flop in the most significant digit position in register 9 contained a "one" the signal at terminal 30 would be negative whereas the signal at terminal 31 would be positive. As a result, diode 28 would be made essentially non-conductive whereas diode 29 would be highly conductive and hence the input IF signal would be applied to the attenuation circuit comprising resistance elements R1 and R2. If, on the other hand, the flip-flop in the most significant digit position in register 9 contained a "zero" the signal at terminal 30 would be positive whereas the signal at terminal 31 would be negative and hence the incoming IF signal would be passed through diode 28 to the input of the next following RF switch whereas the diode 29 would be non-conducting and therefore no attenuation would be introduced by the circuit coupled to it.

It is thus seen that the attenuation introduced via attenuator 10 is directly proportional to the amplitude of the IF signal as it is represented by the number in the register 9.

The output of the attenuator 10 is fed to a conventional RF amplifier 24 whence it is applied to one of two possible paths.

In one path it is applied to a driving amplifier circuit 33 whose output is applied to a detector diode 34 or other detecting device or circuit suitable for demodulating 32 megacycle signals. The IF signal is detected by diode 34 and applied to a switch 35 having contacts 35a and 35b and a switch arm 35c. When the switch arm touches contact 35b, the non-coherent signal from diode 34 is applied to a five-bit analog-to-digital converter 36. Actually, only four-bits of digit-representing information are required but the fifth-bit indicates the sign. The converter 36, like the converter 8 and buffer 39, is operated in the proper time sequence by signals applied thereto from timing circuits 37 which are synchronized by clock pulses from clock pulse source 38. It is the function of the converter 36 to convert the attenuated and detected IF analog signal from diode 34 to a four-bit digital word indicative of the four most significant figures. This word is applied to four flip-flop circuits or other appropriate storage elements in a nine-bit buffer storage 39.

To four other "places" or flip-flops in the buffer storage 39 four digits are simultaneously applied from the register 9, via a delay circuit 40. The latter digits are the "floating point" digits, that is to say, they indicate the number of zeroes which must be added to the right of the four digits from converter 36 to restore the proper absolute magnitude of the eight digit number representing the attenuated amplitude of the incoming IF signal. The buffer storage 39 also contains a flip-flop or equivalent circuit whose condition represents the sign of the eight-bit number stored therein.

The nine-bit stored number in buffer 39 is then applied to an appropriate digital data analyzer 42, for example, or to a tape recorder 41, if desired.

In some cases it is desired to have a coherent, rather than a non-coherent, data presentation or recording as, for example, when it is desired to know the velocity or the acceleration of the object being tracked. In such case the switch 35 is set with its arm 35c in the position shown. In this position, the binary attenuated IF signal from attenuator 10 is mixed with a reference signal generated in the manner now to be described. The clock 38 produces a sixteen megacycle signal which is multiplied by 2 in multiplier 44 and the resultant 32 megacycle signal synchronizes a reference oscillator 45 which produces one output that is used to supply 32 megacycle bursts to the transmitter. The other ouput of oscillator 45 is applied to a balanced mixer 46.

Another output of the clock 38 is divided by four in frequency in the divider 47 and the resultant four megacycle signal is amplified in a conventional amplifier 48 and applied to the balanced mixer 46. The latter mixer is constructed to extract substantially only the sum signal at 36 megacycles and apply it to amplifier 49. The mixer 46 actually need not be balanced if appropriate filters are used to isolate only the sum frequency signal. From mixer 46 the 36 megacycle signal is applied to one input of the balanced mixer 50 which, like mixer 46, need not be balanced so long as filters or equivalent means are provided to extract only the difference frequency signal. To the other input of the mixer 50 the binary-attenuated, undetected IF signal at 32 megacycles is applied from amplifier 24. The mixer 50 includes circuits which extract substantially only the four megacycle difference signal which is applied to amplifier 51 and thence to the contact 35a. The processing of this coherent signal subsequent to the switch 35 is substantially the same as in the non-cohered case previously explained.

A unique feature of this coherent sampling and recording system is the possibility of obtaining both the in-phase and quadrature components of the received signals using a common circuit for both. By sampling an IF signal with less than 4 megacycle bandwidth at 16 megacycles, it is possible to discard half of the output samples from the converter 36 without loss of non-redundant data. Every other adjacent pair of samples would be discarded, thus retaining the in-phase and quadrature components.

This may be done by using different sampling rates in the binary attenuator 10 and in either the analog-digital converter 36 or the buffer storage 39. For example, the binary attenuator could be operated at 4 megacycles while the converter 36 or storage 39 could be operated at 16 megacycles, both of these frequencies being readily available from the components illustrated in FIG. 1. This could be accomplished by applying 16 megacycle timing signals from circuits 37 either to the converter 36 or to the buffer storage 39. By extracting the in-phase and quadrature components from a common channel it is possible to avoid errors arising from the use of two separate mixers and amplifiers for the in-phase and quadrature components respectively.

Since the output of the buffer storage 39 is only nine-bits, the tape recorder 41 may be of relatively simple and inexpensive design. It operates efficiently since substantially all of the tape is used to store signal information. The recorded information, being in digital form, needs no relatively long time period, as is the case with recorded analog data, to program it for processing by a conventional electronic data processor.

The system as shown in FIG. 1 represents only one possible form that my invention may take. A number of substitutions can be made for various ones of the blocks in the overall system shown in FIG. 1. For example, instead of using a log IF circuit 7, there could be a number of parallel IF channels each of which has a different fixed attenuator followed by an IF amplifying stage followed by a conventional threshold detector, the output of all of the threshold detectors being applied to a logic circuit. Another output of each IF amplifying stage would be respectively applied to a different one of a number of switches, all of the switches having a common output. The logic circuit would have leads for applying its output signals to respective ones of the switches. The logic circuit is so constructed that it will enable the IF signal to pass through only one of these IF channels. The "enabled" channel will be (1) the one in which the amplified IF signal has attained its threshold and (2) which has the relatively largest attenuation characteristic. It does this by producing one enabling signal for application to the switch associated with the channel in which the signal has met the two conditions previously explained. Simultaneously, the logic circuit will produce respective disabling output signals for application to the other switches so that only the amplified IF signal in the one selected channel will proceed to the analog-to-digital converter 8. Appropriate timing signals would also be applied to selected components of the channels, i.e., the logic circuit, for producing an effective sampling action.

A word should also be said about the meaning of the words "low duty cycle" as used herein. Previously it has been stated that these words are intended to cover instrument radar systems having 1% duty cycle signals, for example. In addition, however, the very real practical advantages of this system may be exploited with other duty cycles up to about 50%.

As many other variations of the previously explained system will doubtless occur to those skilled in the art but which are encompassed within the scope of my invention, I desire my invention to be limited solely by the claims herein.

I claim:
1. A system for processing analog signals having a low-duty cycle comprising:
    (a) means for compressing the amplitude range of said analog signals and for demodulating them,
    (b) a first analog-to-digital converter coupled to said compressing and demodulating means for producing a first digital signal representative of the amplitude of said analog signals,
    (c) means to which said analog signals and said first digital signal are applied for attenuating said analog signals as a function of the magnitude of said first digital signal,
    (d) means for demodulating said attenuated analog signals,
    (e) a second analog-to-digital converter for producing a second digital signal in response to said demodulated attenuated signals, and
    (f) storage means to which said first and second digital signals are substantially simultaneously applied, said second digital signal corresponding to selected significant digits of a digital number which represents the amplitude of said analog signals and said first digital signal indicating the binary point of said digital number.

2. The signal processing system according to claim 1 wherein said means for demodulating said attenuated signal includes a non-linear detecting means and produces a non-cohered output signal.

3. The system according to claim 1 wherein said means for demodulating said attenuated signal includes a mixing means to which said attenuated signal and a signal of reference phase are applied, said demodulating means producing a cohered output signal in response thereto.

4. A system for processing wide amplitude range analog signals having a low duty cycle comprising:
    (a) means for amplifying said analog signals as an inverse function of the amplitude thereof, said means also demodulating said analog signals,
    (b) a first analog-to-digital converter responsive to said demodulated signals for deriving a first binary digital signal therefrom which represents the amplitude of said amplified analog signals,
(c) a first storage means to which said first digital signal is applied,
(d) attenuation means to which said analog signal and said stored first digital signal are applied, said attenuation means being constructed to limit said applied analog signals to a predetermined amplitude range as a function of the magnitude of said first digital signal,
(e) means for demodulating said limited analog signals,
(f) a second analog-to-digital converter for converting said demodulated signals to a second binary digital signal,
(g) a second storage means to which said first and second digital signals are applied simultaneously, said first and second digital signals representing a digital number whose most significant figures are contained in said second digital signal and whose binary point is determined by said first digital signal, and
(h) signal utilization means coupled to said second storage means.

5. The signal processing system according to claim 4 wherein said (e) means is a non-linear detecting device which produces an uncohered output signal.

6. The signal processing system according to claim 4 wherein said (e) means is a mixer to which said amplitude-limited analog signals and a signal of reference phase are applied to produce a cohered difference frequency signal.

7. The signal processing system according to claim 4 wherein said utilization means includes magnetic tape recording apparatus.

References Cited by the Examiner
UNITED STATES PATENTS

| | | | |
|---|---|---|---|
| 3,027,079 | 3/1962 | Fletcher | 235—154 |
| 3,094,609 | 6/1963 | Weiss | 235—157 |

ROBERT C. BAILEY, *Primary Examiner.*

I. S. KAVRUKOV, *Assistant Examiner.*